(12) United States Patent
Neumann

(10) Patent No.: US 7,307,809 B2
(45) Date of Patent: Dec. 11, 2007

(54) CORRELATION SERVO FOR POSITIONING RECORDING HEAD

(75) Inventor: Lawrence G. Neumann, Lancaster, MA (US)

(73) Assignee: Quantum Corporation, San Jose, CA (US)

( * ) Notice: Subject to any disclaimer, the term of this patent is extended or adjusted under 35 U.S.C. 154(b) by 12 days.

(21) Appl. No.: 11/208,340

(22) Filed: Aug. 18, 2005

(65) Prior Publication Data

US 2007/0041121 A1 Feb. 22, 2007

(51) Int. Cl.
*G11B 5/584* (2006.01)
*G11B 5/09* (2006.01)
*G11B 21/02* (2006.01)

(52) U.S. Cl. .................... 360/77.12; 360/53; 360/75

(58) Field of Classification Search ................ None
See application file for complete search history.

(56) References Cited

U.S. PATENT DOCUMENTS

| | | | |
|---|---|---|---|
| 5,257,148 A | 10/1993 | Solhjell et al. | |
| 5,294,791 A | 3/1994 | Pahr et al. | |
| 5,379,165 A | 1/1995 | Pahr et al. | |
| 5,394,277 A | 2/1995 | Pahr et al. | |
| 5,432,652 A * | 7/1995 | Comeaux et al. | 360/77.12 |
| 5,452,152 A * | 9/1995 | Rudi | 360/77.12 |
| 5,488,525 A * | 1/1996 | Adams et al. | 360/77.12 |
| 5,493,553 A | 2/1996 | Maurice et al. | |
| 5,568,327 A | 10/1996 | Pahr et al. | |
| 5,640,285 A | 6/1997 | Maurice et al. | |
| 5,796,710 A | 8/1998 | Maurice et al. | |
| 5,946,159 A * | 8/1999 | Chliwnyj et al. | 360/77.12 |
| 5,982,711 A * | 11/1999 | Knowles et al. | 360/77.12 |
| 6,078,463 A | 6/2000 | Pahr et al. | |
| 6,108,159 A * | 8/2000 | Nute et al. | 360/77.12 |
| 6,721,126 B1 * | 4/2004 | Bui et al. | 360/78.12 |
| 6,754,026 B1 * | 6/2004 | Koski | 360/73.04 |
| 6,873,487 B2 * | 3/2005 | Molstad | 360/75 |
| 7,106,544 B2 * | 9/2006 | Dugas et al. | 360/75 |
| 7,136,255 B2 | 11/2006 | Mahnad et al. | |
| 7,149,050 B2 | 12/2006 | Saliba et al. | |

OTHER PUBLICATIONS

Bain, A.J. et al. (Mar. 1999). "Limitations to Track Following Imposed by Position Error Signal SNR Using a Multi-Tapped Magnetoresistive Servo Head, " IEEE Transactions On Magnetics, 35(2):740-745.
Raastad, J. "Leveraging O-MASS Technology for a Multi-Terabyte Removable Media Solution, " O-Mass AS/Tandberg Storage ASA, presented at the THIC Meeting at the National Center for Atmospheric Research, Boulder, CO (Jul. 19-20, 2005).

* cited by examiner

*Primary Examiner*—K. Wong
(74) *Attorney, Agent, or Firm*—Morrison & Foerster LL

(57) ABSTRACT

Tape heads and controllers for controlling such heads in a tape drive are described. A controller may determine a first parameter corresponding to the similarity between data read by a first pair of read elements of a head, a second parameter corresponding to the similarity between data read by another pair of read elements having one read element in common with the first pair, and a position of the head with respect to a data track based upon a relationship between the first and second parameters. The controller may adjust the head to a proper lateral position based upon the determined position.

77 Claims, 9 Drawing Sheets

CORRELATION SERVO FOR POSITIONING RECORDING HEAD

BACKGROUND OF THE INVENTION

1. Field of the Invention

The present invention generally relates to storage devices, and more particularly to servo systems for compensating for lateral tape motion.

2. Related Art

Increased data storage capacity, and retrieval performance, are desired of all commercially viable mass storage devices and media. In the case of linear tape recording a popular trend is toward multi-head, multi-channel head structures with narrowed recording gaps and data track widths, so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. LTM may be caused by many factors including, tape slitting variations, tension variations, imperfections in the guiding mechanism, friction variations mainly at the head, and environmental factors such as heat and humidity. These factors affect LTM in various ways. Some may cause abrupt momentary jumps while others may cause a static shift. Generally, LTM is unpredictable and unrepeatable.

In multi-head, multi-channel magnetic tape storage systems, random lateral tape motion is generally a limiting factor in achieving higher track densities and thus higher user data capacity per tape. In order to maintain proper alignment of the head with the storage tape and data tracks on the tape, the tape is generally mechanically constrained to minimize LTM and data retrieval errors. Mis-registration between the head and data tracks can cause data errors during readback and data loss on adjacent tracks during writing.

Various techniques for increasing the track density on magnetic tape employ recording and maintaining servo information on the tape to provide positioning information to a tape drive system during writing and/or reading processes. Some techniques employ optical servo tracks on the back of the tape, whereas others use magnetic servo information on the recording surface of the tape. In addition, unlike the optical systems mentioned above, the optical system of U.S. Pat. No. 5,493,553 has its polarization influenced by (presumably magnetic) tracks of the tape. That system performs track following by moving optical components, rather than mechanical elements in contact with the tape.

SUMMARY OF THE INVENTION

The present invention provides a variety of tape heads and controllers for controlling such heads in a tape drive. In one embodiment, the tape head includes a first data read element for reading data from a first track of a magnetic tape, a first servo read element located at a first lateral position with respect to the first data read element, and a second servo read element located at a second lateral position with respect to the first data read element. The first data read element lies laterally between the first and second servo read elements.

The first and second servo read elements may be magnetic read elements, and, in particular, magneto-resistive read elements.

An associated controller may include position determination logic for determining a first parameter corresponding to the similarity between data read by the first data read element and the first servo read element, a second parameter corresponding to the similarity between data read by the first data read element and the second servo read element, and a position of the first data read element with respect to the first track based upon a relationship between the first and second parameters. The controller also may include position control logic for adjusting the first data read element to a proper lateral position based upon the determined position of the first data read element.

The first and second parameters may be first and second correlation values, respectively. An equality of the first and second correlation values may indicate that the first data read element is centered on the first magnetic track. In one aspect, at least when the first data read element is properly positioned, each of the first and second servo read elements may read data from the first track and, respectively, from a first adjacent track laterally adjacent the first track and from a second adjacent track laterally adjacent the first track. In another aspect, at least when the first data read element is properly positioned, the first and second servo read elements and the first data read element may read data only from the first track.

The head may further include a write element positioned longitudinally behind the read elements with respect to a travel direction of the tape, and the controller may servo using the read elements during writing. The head may further include a read verification element, positioned longitudinally behind the write element with respect to a travel direction of the tape, and the controller may verify data written by the write element using the read verification element.

In one embodiment, the controller may include a frequency detector for determining at least one frequency of data read from at least two read elements, such as the first data read element and the first servo read element. The controller may include logic for identifying the track over which the first data read element is positioned based upon detected frequency.

In another embodiment, the tape head includes a first data read element for reading data from a first track of a magnetic tape, a second data read element for reading data from a second track of the tape, a first servo read element located at a first lateral position between the first data read element and the second data read element, and a second servo read element located at a second lateral position with respect to the second data read element, where the second data read element is between the first and second servo read elements.

The associated controller may include position determination logic for determining a first parameter corresponding to the similarity between data read by the second data read element and data read by the first servo read element, a second parameter corresponding to the similarity between data read by the second data read element and data read by the second servo read element, and a position of the first data read element with respect to the first track based upon a relationship between the first and second parameters. The controller may further include position control logic for adjusting the first data read element to a proper lateral position based upon the position of the first data read element.

The head may also include a write element positioned longitudinally as to the first data read element with respect to a travel direction of the tape. In that case, the controller may servo off the second track using the first and second servo read elements during writing of the first track.

The head may further include a third servo read element located at a lateral position with respect to the first data read element so that the first data read element lies between the first and third servo read elements. The controller may use the first and third servo read elements to servo off the first track written by the write element. The controller may use the first and second servo read elements to read pre-written servo information from the second track. In one embodiment, the controller may write the pre-written servo information to the second track by servoing off an edge of the tape.

In another embodiment, a tape head cluster may include a data head having at least one data read element for reading data from data tracks in a data band, and a servo head mechanically coupled to the data head. The servo head may include at least three servo read elements for servoing off servo tracks in a servo band. Each servo read element may be substantially the same width as a data track, and each data read element may be a fraction of the width of a servo read element.

An associated controller includes position determination logic for determining (a) a first parameter corresponding to the similarity between data read by a first pair of servo read elements, (b) a second parameter corresponding to the similarity between data read by a second pair of servo read elements having one read element in common with the first pair and which is aligned with a first servo track, and (c) a first position of the data head based upon a relationship between the first and second parameters. The controller further includes position control logic for laterally positioning the data head with respect to a first data track based upon the first position. Each data track may be the same fraction (e.g., one-half) of the width of a corresponding servo track in the servo band.

The servo head may include at least four read elements. In response to the position control logic laterally moving the tape head cluster, the position determination logic may determine (a) a third parameter corresponding to the similarity between data read by a third pair of read elements having one read element that is in common with the second pair and which is aligned with the first servo track, and (b) a second position of the data head based upon a relationship between the second and third parameters. The position control logic may laterally position the data head to a proper position with respect to a second data track based on the second position.

In another embodiment, a tape head cluster may include N+1 read elements, which themselves include at least three servo read elements for servoing off a servo track. An associated controller includes position determination logic for determining (a) a first parameter corresponding to the similarity between data read by a first pair of read elements, and (b) a second parameter corresponding to the similarity between data read by a second pair of read elements having one read element in common with the first pair and which is aligned with respect to the servo track. The controller also includes position control logic for laterally moving the tape head cluster to servo N−1 data track positions off the servo track.

In another embodiment, a tape head cluster includes first and second servo heads and at least one data head for accessing data in a data band. The at least one data head is laterally positioned between the first and second servo heads, and each servo head includes at least three read elements for servoing off servo tracks in respective first and second servo bands. An associated controller includes position determination logic for determining, for each servo head, (a) a first parameter corresponding to the similarity between data read by a first pair of read elements in the servo head, (b) a second parameter corresponding to the similarity between data read by a second pair of read elements in the servo head, the second pair having one read element in common with the first pair, and (c) first and second positions of the respective first and second servo heads based upon a relationship between the first and second parameters. The controller also includes position control logic for adjust the head cluster to a lateral position based upon the first and second positions. The position control logic may adjust the head cluster to a lateral position that minimizes the errors experienced by the first and second servo heads.

DETAILED DESCRIPTION OF THE INVENTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Figure 1:
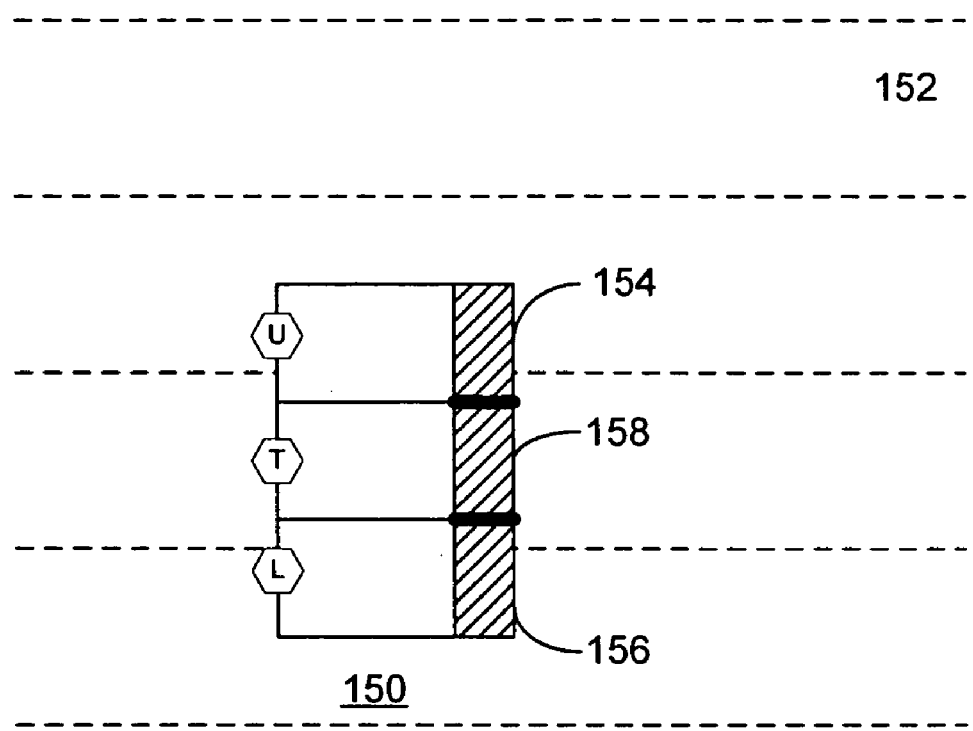
FIG. 1 illustrates a three-segment reader according to embodiments of the present invention.

FIG. 1 illustrates a multi-tapped three-segment reader (MTR) 150 adjacent to data tracks on a magnetic medium 152 according to embodiments of the present invention. The edges of the data tracks are indicated by dashed lines and the three segments of the MTR are shown as hashed areas. Each segment is connected by wires, indicated by solid lines, to electronic circuits, indicated as hexagons, which retrieve signals from the reader-segments. The MTR includes an upper servo read element 154, a lower servo read element 156, and a data read element 158 between the servo read elements. Each read element may be a magneto-resistive ("MR") element in contact with the magnetic medium 152, as is known in the art. The magnetic medium 152, such as tape, travels relative to the MTR in a longitudinal direction. The tape includes multiple tracks, which may be laid out in a linear fashion.

According to one format, physical tracks may be grouped according to bands, channels and logical tracks. A physical track is the area transversed on the tape medium by a recording head at a particular lateral position. Physical tracks laterally adjacent to each other and traversed by the same recording head at different lateral positions within a band are identified as being associated with the same "channel." (For the sake of convenience, we will sometimes refer herein to a head (e.g., a reader, writer or read/write pair, as the case may be) operating within a band as a "channel.") For example, multiple physical tracks written by one head may be laterally adjacent to each other as a group, followed by another set of physical tracks associated with another channel. A head can continue to step laterally to write physical tracks within a band, but stops before it reaches a track written by the next adjacent head in the head cluster, to avoid overwriting the track written by the next adjacent head. The group of physical tracks associated with a channel corresponds to a "logical track." Unless otherwise indicated herein, any reference to "track" herein refers to a physical track. All the adjacent physical tracks traversed by all recording heads in a head cluster represent a "band." In other words, the band is the collection of interleaved physical tracks accessed by the head without any one channel crossing laterally over a physical track associated with another channel.

Figure 2:
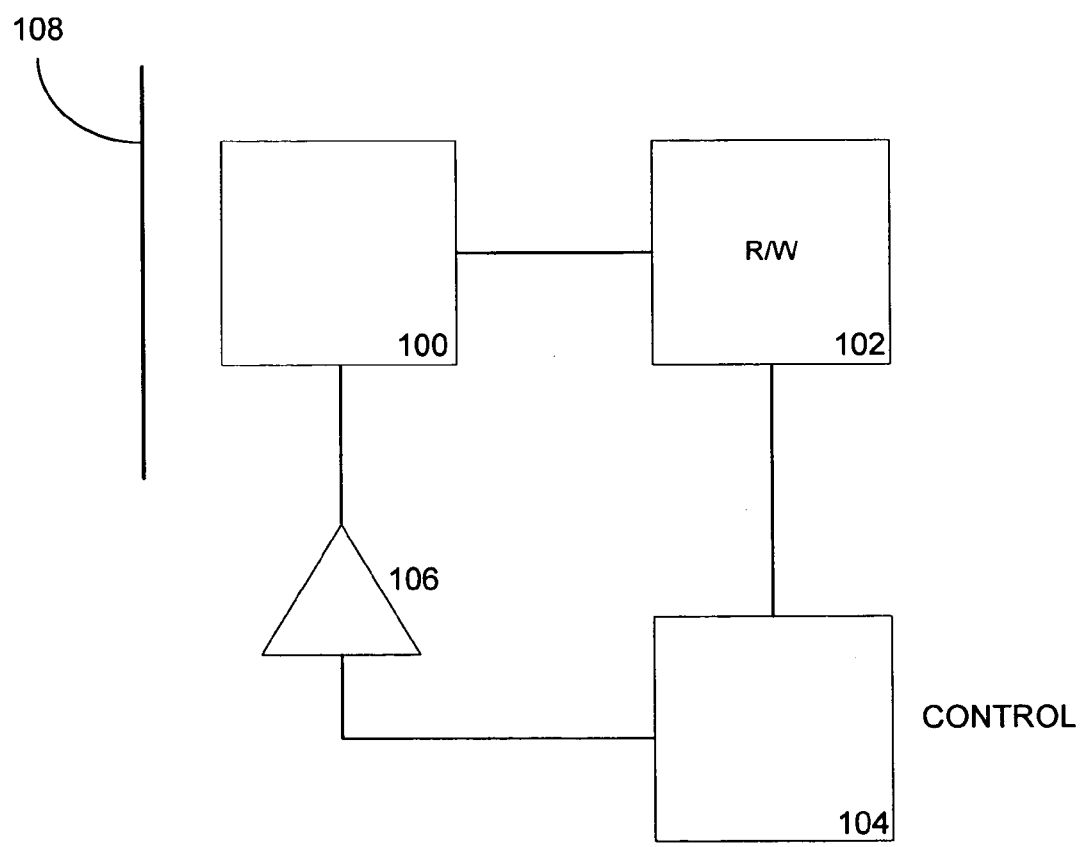
FIG. 2 illustrates a servo system according to embodiments of the present invention.

FIG. 2 illustrates a servo system according to embodiments of the present invention. The servo system may operate within a media drive, such as a tape drive. The system includes a recording head 100 having a reader according to embodiments of the invention, read/write electronics 102 for respectively reading and writing signals from and to the reader, a servo controller 104, and a positioning actuator 106 for laterally moving the recording head 100. As noted above, the head 100 may include read elements, such as MR elements, in contact with the tape.

Through the reader and the read/write electronics 102, the controller 104 reads the signals from the data track and the respective upper and lower adjacent tracks of a tape 108. The controller 104 determines a first correlation value r1 between the signals from the upper servo track and the data track, and a second correlation r2 between the signals from the lower servo track and the data track. Note that, due to encryption, any data (servo or otherwise) written on tracks is relatively random and uncorrelated, thereby enabling different correlations schemes to work regardless of the original statistical properties of the data. Based upon a relationship between the first and second correlations, the controller 104 determines a position of the MTR with respect to the data track. The position may be represented by a position error signal (PES). In one embodiment, the controller determines that the MTR is centered on the data track when the first and second correlations are equal. The PES for this example may be PES=r1−r2 =0.

The controller uses the PES to adjust the lateral position of the MTR. In the example, above, if PES>0, then this represents that r1>r2, which means that the upper servo read element is overlapping the data track too much compared to the lower servo read element. In this case, the controller will instruct the actuator to move the MTR laterally upwards until the PES=0. Conversely, if PES<0, then r1<2, which means that the lower servo read element overlaps the data track more than the overlap of the upper servo read element with the data track. The controller 104 will thus instruct the actuator 106 to move the MTR down until PES=0.

In the foregoing example, it is assumed that the controller 104 is calibrated so that r1 does indeed equal r2 when the data read element is centered over the data track. In actual operation, one of the servo read elements may be more sensitive than the other, resulting in an imbalance of correlations, and a non-zero PES, when the MTR is centered. The controller may be calibrated before operation to correct for any such errors.

In another embodiment of the invention, it may be desired that the data read element not be centered over the data track. In this case, the controller 104 may adjust the position of the actuator 106 so that the ratio of the two correlation values r1 and r2 be at some set value other than 1.0. The data read element would then be shifted toward the side with the smaller correlation value. Again, a calibration procedure could be used to adjust for sensitivity variations between the side segments.

Two constraints on the operation of the controller are that the distance between the proximal edges of the upper and lower servo read elements (i.e., the edges nearest to each other) is less than a lateral width of the data track, and the distance between the distal edges of the servo read elements is greater than the lateral width of the data track. These constraints should be met so that, when the data read element is centered on the data track, the upper and lower servo read elements are able to read sufficient data from the data track and the upper and lower adjacent tracks, respectively, in order to develop the first and second correlation values. This assures that the data read element, such as 158 in FIG. 1, will remain on the data track, and will not move laterally so that it is partially over an adjacent track, thus maintaining a good signal free of interference from adjacent tracks. Note that "upper" and "lower" in this application refer to positions in the lateral direction perpendicular to the direction of tape transport.

The second constraint may be relaxed for reading wide tracks if the location of the data read element is not required to be centered on the track but rather is allowed to be anywhere in the written track. In this case, r1=r2=1.0 when all three segments of the MTR are over the same wide written track and the information sensed by the center segment would reflect accurate data recovery. If either correlation parameter decreased, as would occur when a side segment moved off the wide track onto an adjacent track, the controller 104 would adjust the actuator 106 to ensure that the data read element remains on the written track, away from the track edge.

One advantage of the correlation servo technique is that it is backward compatible with tapes having differing track widths. For example, if the track width is such that each servo read element overlaps half the data track when the MTR is centered, then r1=r2=0.5. If, on the other hand, the tracks are wider, then the upper and lower servo read elements of the same MTR would overlap the center data track more than the adjacent tracks, perhaps leading to r1=r2=0.75, for example, or even r1=r2=1.0, as mentioned above. Thus, regardless of track width, PES would be zero, allowing for centering of the MTR.

Isolation of the different read element segments of the MTR is not required. Feedthrough from the middle segment to an end segment will increase the correlation of the signal from the end segment read element with the center data read segment. Assuming that this feedthrough is symmetric, this will only increase the magnitude of both of the correlation values, but will not affect the differential PES value, and thus will not affect positioning. If this feedthrough is not symmetric, any differences can be compensated for by the calibration process described earlier.

The invention is useful for reading data from a pre-written tape and ensuring that the read elements of the head stay aligned with the data tracks on the tape. If there is data on the tape that is to be written over, that data could be used to supply the controller with information about where the data tracks should be. On a new tape or an erased tape, however, that stores no data, there is no information to ensure alignment of the head to the proper position on the data track.

Figure 3:
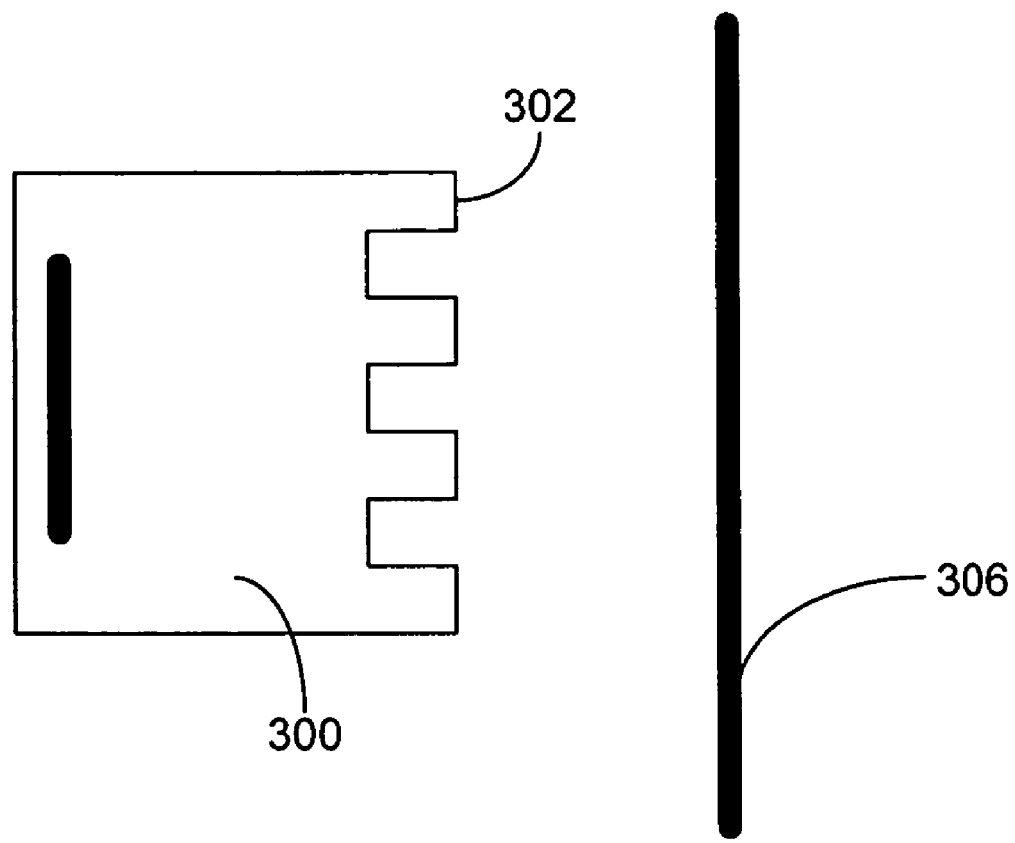
FIG. 3 illustrates a toothed writer according to embodiments of the present invention.

One solution is to pre-write servo tracks on the tape for the MTR to sense. This can be done in multiple passes with a typical write head or, more efficiently, using a dedicated, toothed writer, with a wide-pole inductive transducer 300, as shown in FIG. 3. The toothed writer may include a continuous bottom pole (not shown; behind the toothed top pole) that spans at least the entire width of the servo band to be written. A top pole has a connecting arm (not shown; going into the page) to the bottom pole, and multiple pole tips ("teeth") 302 that extend from the pole body to the surface of the head where they are separated from the bottom pole by a write gap. An insulated coil (not shown) loops around the connecting arm in such a way as to generate a magnetic field at the write gap. The tape 306 is adjacent to the teeth 302, and travels in a direction perpendicular to the plane of the page.

Each of the several pole tips 302 may have a sufficient width to be able to write a servo track containing a series of magnetic transitions on the magnetic medium 306 equal to the desired width of the data track to be written on the medium. The space between the pole tips 302 may be wide enough to leave an unrecorded track of magnetic medium of the same width as the data track. The writer can thus simultaneously write alternate tracks with the same information, to leave a pattern that can be used for servoing. The servo data need only be written in the band that the MTR would use for servoing. The MTR would track on either the track written by a "tooth" of the top pole or on the gap between two such tracks.

If the servo signal were lost, the servo system may employ a step and search routine to recover the proper track, similar to what SDLT® drives (manufactured by the assignee of the invention) do now. However, since each written track contains effectively the same pattern of written information, it is difficult to distinguish between one such track and any other track. The controller 104 may need to move the actuator 106 so that the servo sensor is entirely off the band where the servo information is written, and then step the head back to the proper track while counting the number of servo tracks the head moves over.

Figure 4:
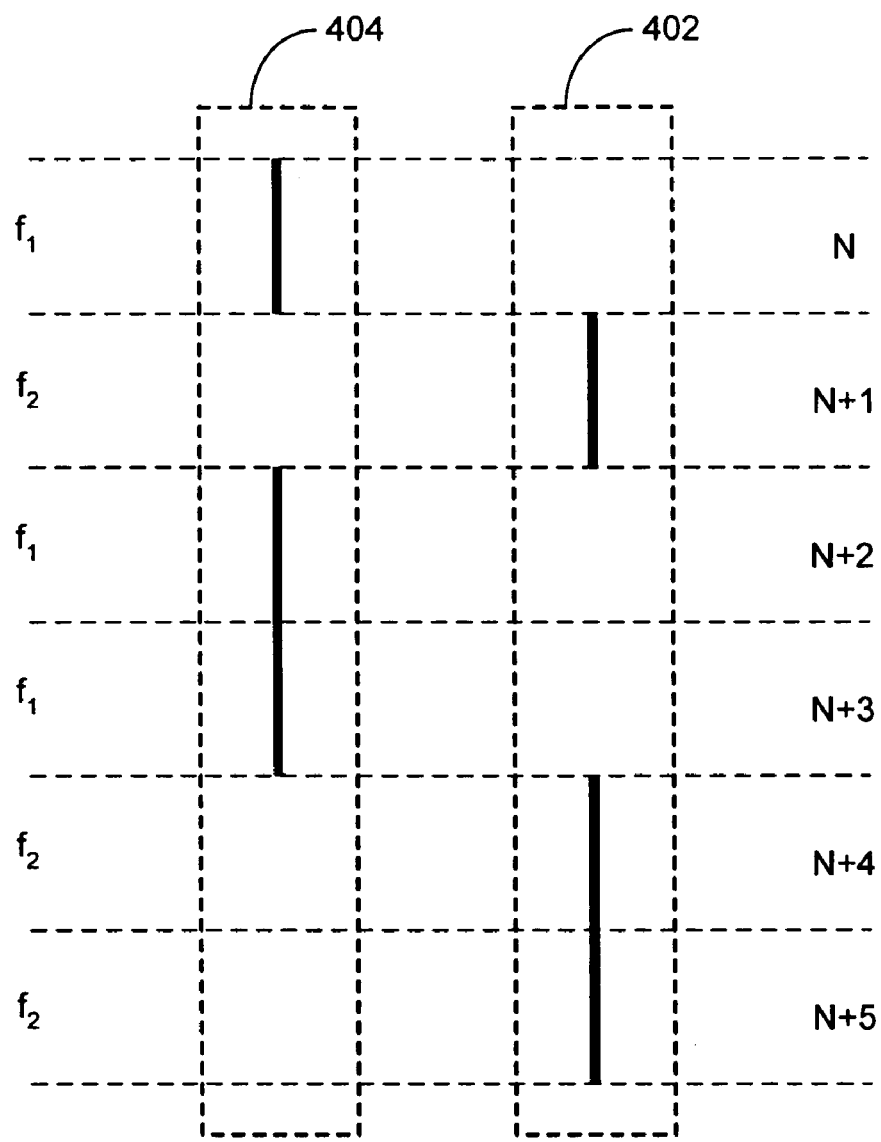
FIG. 4 illustrates a dual-frequency writer according to embodiments of the present invention.

To avoid this situation, a more complicated servo-writer head could be built with multiple toothed writers longitudinally offset with respect to each other in the direction of the tape motion and with "teeth" in different locations within the servo band, as shown in FIG. 4. The write gaps, where the head will write a pattern, are shown as dark lines. These write gaps, as well as the spaces between the teeth of each such writer, may be an integral multiple of the width of a data track. Writing tracks with the first writer 404 at one bit density (related to spatial frequency), and the second writer 402 at a second, distinct bit density, would allow different information to be written to different tracks, which could be used as a type of track identifier. Then the drive using the head would have the capability to calculate what track it is on by analyzing the frequency of the data read. As the three segments of an MTR read data from these tracks, it would detect different frequencies in the different segments.

Using the example layout of FIG. 4, the first toothed writer 404 may write at a first frequency f1 on tracks N, N+2 and N+3, and the second writer 402 may write at a second frequency f2 on tracks N+1, N+4 and N+5. (FIG. 4 shows the perspective looking down at the footprint of the teeth on the tape.) Assume a three-segment reader having the same relationship between segment width and track width as the reader shown in FIG. 1. Also assume that the reader has been positioned over a track, and that the controller 104 includes a frequency detector for detecting the frequencies read by the segments. If a first segment (e.g., the upper servo read element) of the reader detected f1 (perhaps along with f2) a second, lower adjacent segment (e.g., the data read element) detected f2, and a third, lower adjacent segment (e.g., the lower servo read element) detected f1 (perhaps along with f2), then the controller 104 would determine that the reader is positioned over track N+1. If, on the other hand, the upper servo read element detected f1 and the data read element also detected f1, then the controller 104 would determine that the reader is positioned over track N+3. If the upper servo read element detected f1, the data read element detected f2, and the lower servo read element also detected f2, then the controller 104 would determine that the reader is positioned over N+4.

By appropriate arrangement of the teeth of the writers, twelve different track locations, for example, could be uniquely defined by two toothed writers, each with four teeth. The use of more writers with additional frequencies would allow correspondingly more unique track locations to be defined.

Figure 5:
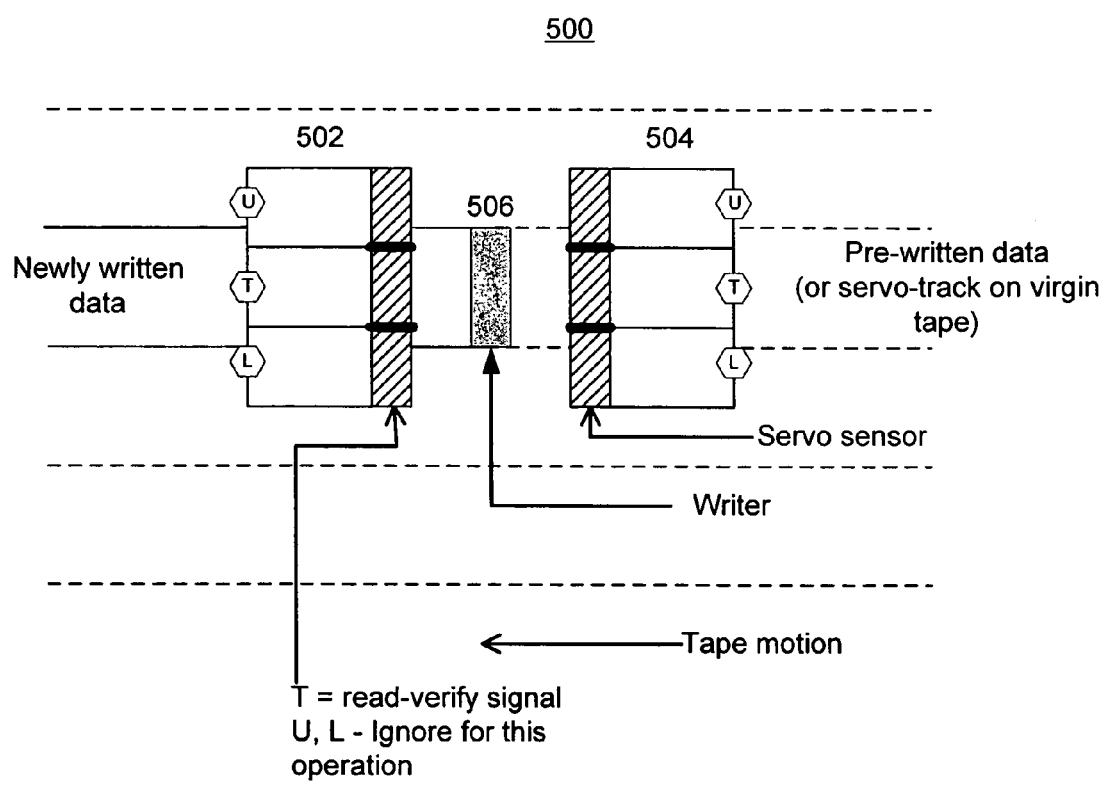
FIG. 5 illustrates a read-write-read ("RWR") head according to embodiments of the present invention.

To use these prewritten servo tracks (with or without frequency information) to control head position while writing new data, or to track on existing data that is to be overwritten, the head of embodiments of the invention may include a servo reader preceding a write element, as illustrated in FIG. 5. The trailing reader 502 provides a read-verify function to verify the data that has been written. The leading servo reader 504 senses the track position before it is obliterated by the writer 506. Using the sensed position, the controller 104 causes the head to follow the servo track, so that the new data is written on the track referenced to the center segment of the MTR. This example employs a read-write-read ("RWR") head 500, allowing servo-controlled writing in both directions. For tape traveling in the opposite direction, such as left to right in FIG. 5, the functioning of the leading and trailing readers is interchanged. Those skilled in the art will recognize that the read and write elements may be implemented as separate bumps on a head or as individual elements built on a single wafer of a "single bump" head separated by on-wafer shields.

Figure 6:
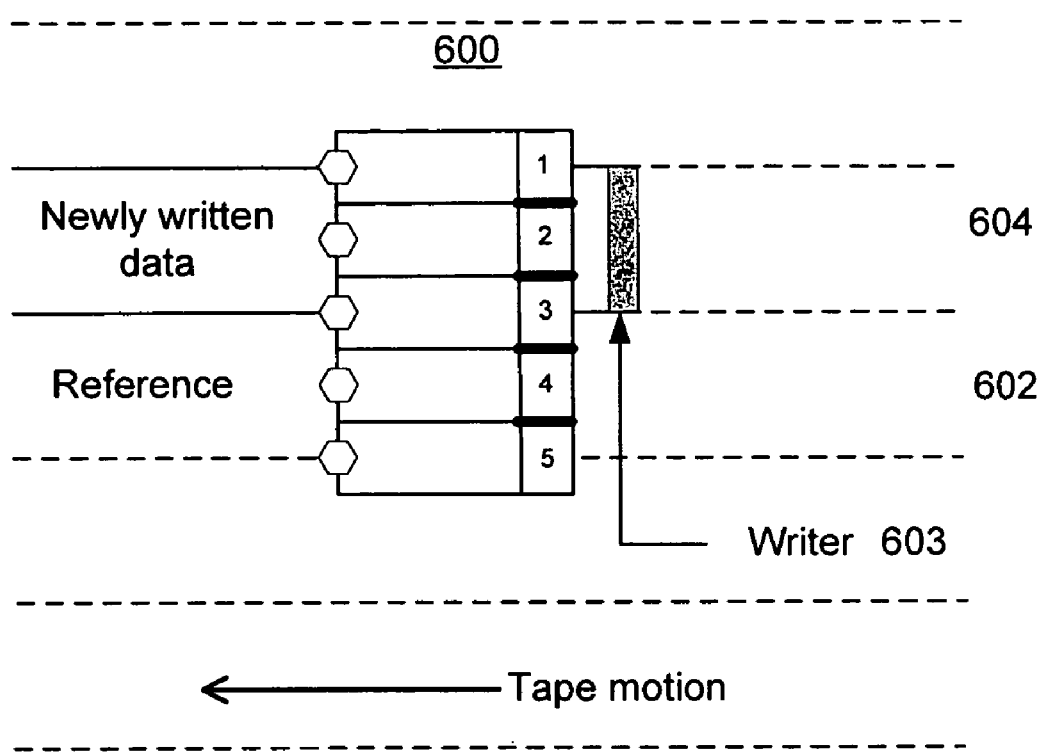
FIG. 6 illustrates a five-segment reader according to embodiments of the present invention.

Another approach for using the prewritten servo tracks while writing new data does not require a reader preceding a write element. Instead, as shown in FIG. 6, this embodiment employs a five-segment MTR 600 that servos off the next lower track 602. The five read segments are aligned as follows (counting from the top of the MTR and assuming that tracks are written from bottom to top by the tape drive). Segment 2 is aligned with the writer 603 and used, during writing, to verify the data written by the writer. The writer 603 may write data to data track 604, which itself may be used for servoing during later write or read operations. During reading, segment 2 may be used for data recovery and servoing. Segments 1 and 3 correspond to the end servo segments of the three-segment reader, and may be used to read servo data from the data track and the adjacent tracks in order to develop the upper and lower correlation values during read servo operations.

Segment 4, below segment 3, is analogous to segment 2 of the MTR, but aligned with the previously written data (now reference) track 602. Segment 5 is analogous to segment 3, an end segment for reading the reference track and the adjacent lower track. Therefore, during the writing of a track 604, segment 4 is positioned on the next lower data (reference) track and used to provide signals for correlation with signals from segments 3 and 5. The reference tracks would be written one track-pitch lower than the data tracks. During subsequent reading of the written data, the data tracks would be read by segment 2, with segments 1, 2 and 3 used to determine the PES. In summary, write servoing would use segments 3, 4 and 5, with segment 2 used for read verification. Read servoing would use segments 1, 2 and 3.

This same method of writing while referencing a previously written track could be achieved with a four-segment reader identical to the five-segment reader except that segment 1 is eliminated, thus simplifying the head structure. The four-segment reader performs write servoing using segments 3, 4 and 5 for servoing off the previously written track, and segment 2 for write verification. During reading, the head is laterally moved up so that the data is read with segment 4 while using segments 3, 4, and 5 for generation of the PES.

Another embodiment for writing data, which does not require prewritten servo tracks, uses the five-segment MTR 600 to servo off the previously written data track. Again assume that tracks are written from bottom to top by the tape drive. In this embodiment, the first track in a band may be written by edge-guiding only, without any tracking servo, as described, for example, in "MASKED POSITION SENSORS AND CONTROL SYSTEMS," application Ser. No. 10/942,678, filed Sep. 15, 2004, and "DIFFRACTIVE POSITION SENSORS AND CONTROL SYSTEMS," application Ser. No. 10/927,732, filed Aug. 27, 2004, assigned to the assignee of the present invention, and incorporated by reference in their entirety herein.

The next track is written by servoing off the first track in the band as a reference, and so on. Every subsequent track in the band is aligned to the previously written track, as described above. The advantage of this method is that pre-written servo tracks are not necessarily required.

Figure 7:
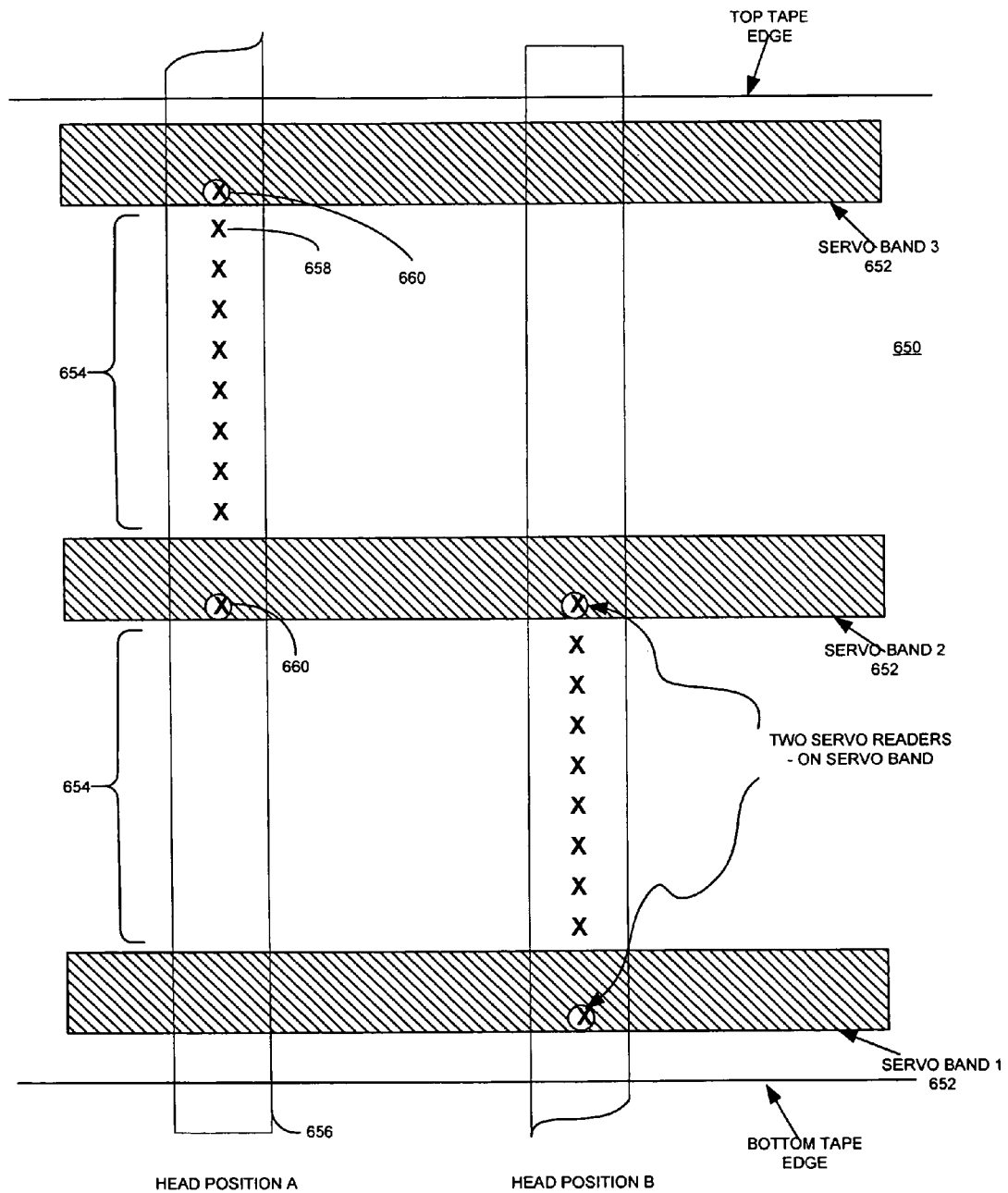
FIG. 7 illustrates a head cluster employing at least one dedicated servo band, according to embodiments of the present invention.

Another approach using a three segment reader employs at least one dedicated servo band. FIG. 7 illustrates a tape 650 having K+1 servo bands 652 with K data bands 654 (where K=2 in this example), allowing servo-redundancy. In this example, the head cluster 656 includes eight data channels 658 and two servo channels 660. Each servo channel may include an MTR, such as that described above.

The number of tracks in each servo band 652 is equal to the number of tracks that each channel 658 of the data head 656 will write in a data band 654, with servo tracks written at the same pitch as the data tracks. The two servo channels in this example, one at the top of the cluster and one at the bottom are kept aligned with the servo information.

This embodiment requires some media area, because each dedicated servo band has a width approximately equal to the channel-to-channel spacing of the data head. This approach avoids problems associated with writing—the servo band is prewritten and the same sensors read the servo tracks whether reading or writing, and writing does not obliterate any information in the servo band.

Moreover, assume, for example, that the tape were stretched lengthwise, thus decreasing the width. By tracking near each end of the head cluster in the embodiment of FIG. 7, the decreasing absolute (as opposed to differential) values of the correlation values from the servo readers 660 would indicate narrowing of the track widths. If the tape were stretched lengthwise, the lateral distance from a servo track read by the servo channel 660 at the top of the head cluster 656 to a servo track at the bottom would decrease, while the distance on the head cluster 656 from a read element 660 at the top to a read element 660 at the bottom remains the same. Assume, for example, that the distance from the centerline of the top reader to the centerline of the bottom reader is 100 mils, and the tape stretches so that the written data tracks are separated by 99 mils. If the top MTR were moved down to center the MTR over the top track to compensate for closer tracks, the bottom MTR would be off by 1.0 mil.

Instead of operating in this manner, the controller 104 of the invention may instruct the actuator 106 to move the head cluster 656 so that the top and bottom MTRs are equally laterally offset by 0.5 mil up and down, respectively, from the centerlines of the top and bottom servo tracks to equalize the individual MTR errors, thereby minimizing the total error. This is achieved by adjusting the r1 and r2 coefficients to achieve the equal lateral offsets.

Figure 8:
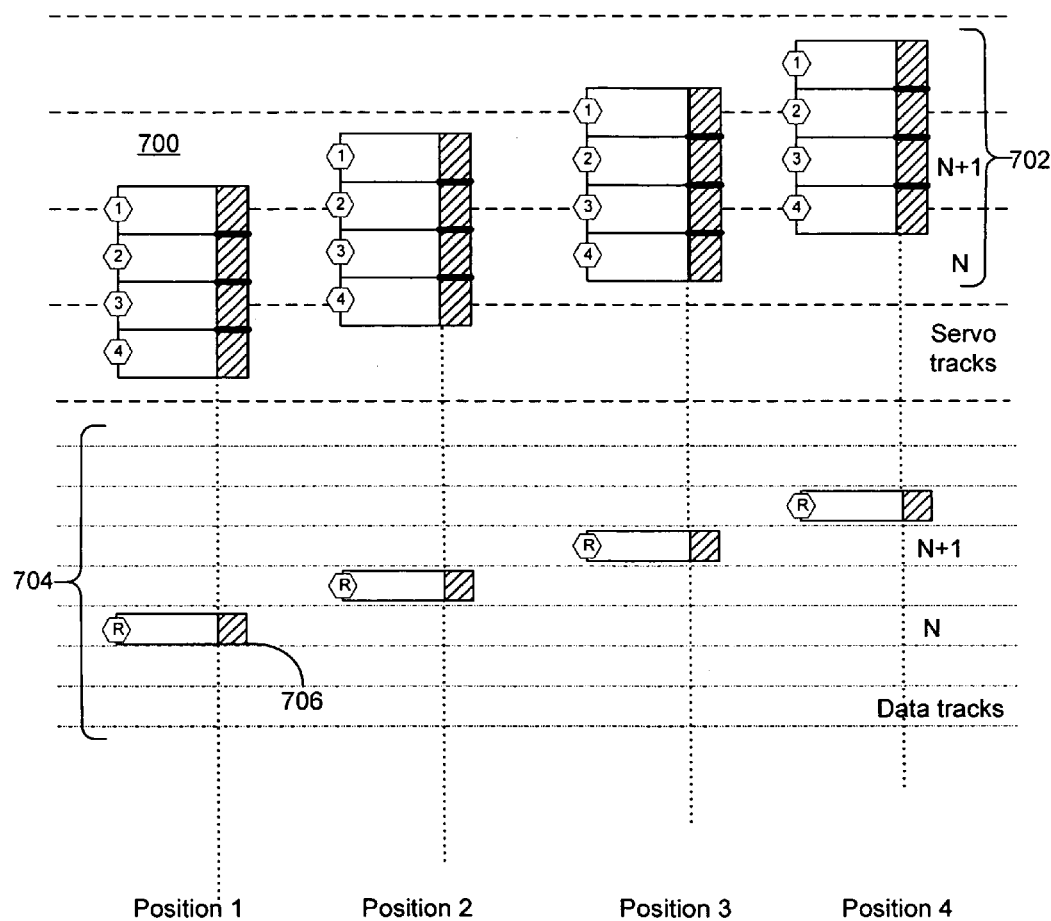
FIG. 8 illustrates a four-segment reader according to embodiments of the present invention.

Referring to FIG. 8, servo tracks 702 in a dedicated servo band may be written at twice the width of data tracks 704 in an adjacent data band. A four-segment reader 700 may be used for servoing. Each servo track in the servo band is shown as twice the data track width in this example. The reader 700 is ganged together in a head cluster with a number of data channels, one of which, data read element 706, is shown connected by a dotted line to the reader 700. This scheme uses segments 1, 2 and 3 of the reader 700 to servo with respect to servo track N with segment 2 over track N, and then moves the head laterally upward and uses segments 2, 3 and 4 to servo with respect to servo track N, with segment 3 over track N. The head moves up again to the next servo track N+1, again using segment 2, and then segment 3, over track N+1.

In this example, each servo segment is the same width as a data track. Ideally, the edge of each servo track lies in the middle of segments 1 and 3 when the servo reader is properly aligned with the track, to achieve r1=r2=0.5. If the junction between adjacent segments had a zero width, each segment would be one half the servo track width. Because of fabrication restrictions, however, the junction width is non-zero (e.g., two microns). Thus, the segments are, in fact, slightly smaller than one half the servo track width.

In this example, the number of tracks in each servo band is equal to the half the number of tracks that each channel of the data head will write in the data band. This eases both the servo-writing and the head fabrication challenges. An extension of this design could have fewer written servo tracks and more segments of the MTR sensor.

Figure 9:
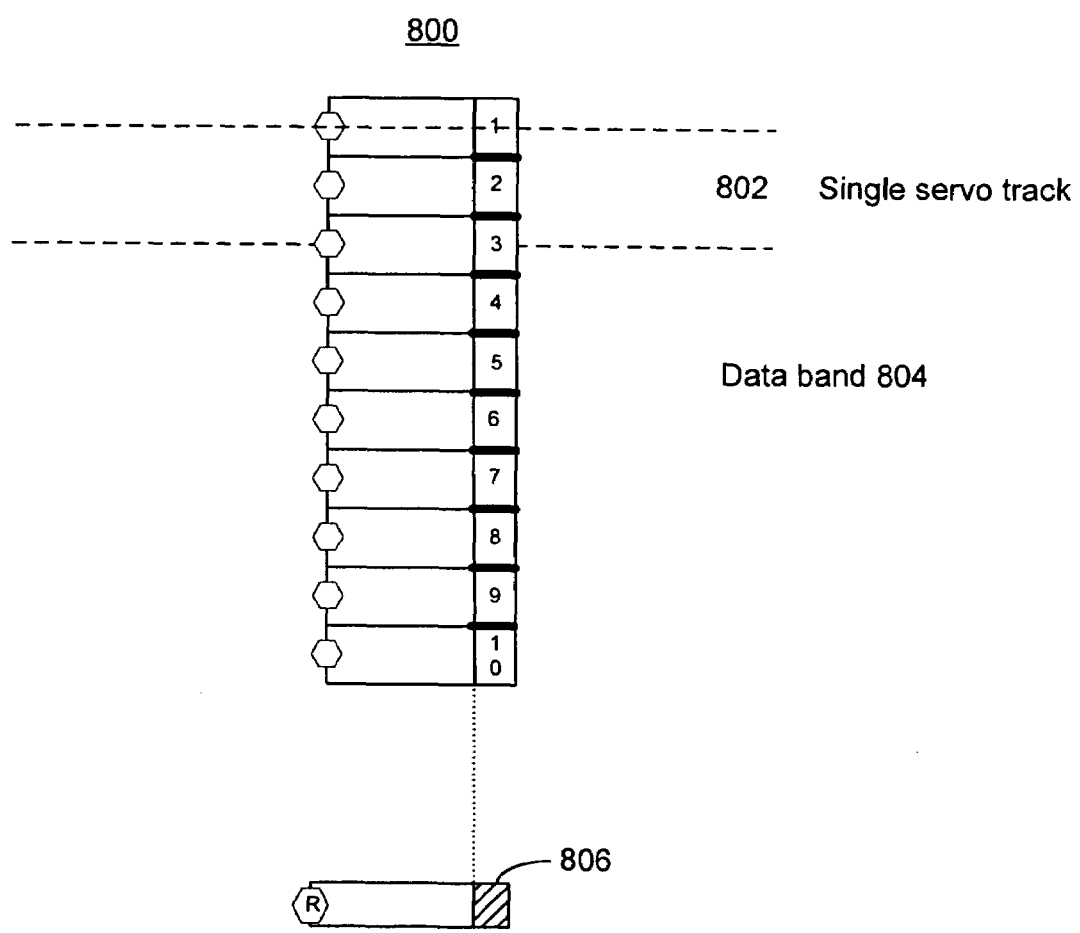
FIG. 9 illustrates a head cluster servoing off of a single servo track, according to the embodiments of the present invention.

Referring to FIG. 9, yet another approach uses an N+1 segment servo MTR 800 with a dedicated servo track 802 between each data band 804, where the number of data tracks in the band is N−1. In this example, N=9. The tape may have K+1 servo tracks and K data bands. A data channel 806 may be ganged together with the servo reader 800 for reading and writing data tracks in the data band 804 adjacent the servo track 802. The MTR 800 may first use segments 1, 2, and 3 to generate the PES for servoing. Then the MTR 800 may move laterally upward, and use segments 2, 3 and 4 to generate the PES. These operations would be repeated for all eight tracks in the data band 804. This method minimizes the area on the media surface that is needed for servo information while preserving the servo information used for all tracks.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination of these. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with a particular embodiment, one skilled in the art would recognize that various features of the described embodiments may be combined in accordance with the invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A tape head comprising:
    a first data read element for reading data from a first track of a magnetic tape;
    a first servo read element located at a first lateral position with respect to the first data read element; and
    a second servo read element located at a second lateral position with respect to the first data read element, wherein the first data read element lies laterally between the first and second servo read elements, and the first and second servo read elements are magnetic read elements;
    wherein a first parameter corresponds to the similarity between data read by the first data read element and the first servo read element, a second parameter corresponds to the similarity between data read by the first data read element and the second servo read element, and a position of the first data read element with respect to the first track is based upon a relationship between the first and second parameters.

2. The head of claim 1, wherein a controller is operable to employ the position of the first data read element to adjust the first data read element to a proper lateral position.

3. The head of claim 1, wherein the first and second parameters are first and second correlation values, respectively.

4. The head of claim 3, wherein an equality of the first and second correlation values indicates that the first data read element is centered on the first magnetic track.

5. The head of claim 1, wherein, at least when the first data read element is properly positioned, each of the first and second servo read elements reads data from the first track and, respectively, from a first adjacent track laterally adjacent the first track and from a second adjacent track laterally adjacent the first track.

6. The head of claim 1, wherein, at least when the first data read element is properly positioned, the first and second servo read elements and the first data read element read data only from the first track.

7. The head of claim 1, further comprising a write element positioned longitudinally as to the read elements with respect to a travel direction of the tape.

8. The head of claim 7, further comprising a read element, positioned longitudinally behind the write element with respect to a travel direction of the tape, for verifying data written by the write element.

9. The head of claim 1, wherein frequency detector is operable to determine at least one frequency of data read from at least two read elements to enable identification of the track over which the first data read element is positioned.

10. The head of claim 9, wherein the at least two read elements include the first data read element and the first servo read element.

11. The head of claim 1, wherein the first and second servo read elements are magneto-resistive read elements.

12. A controller in a tape drive for controlling a tape head, wherein the tape head includes a first data read element for reading data from a first track of a magnetic tape, a first servo read element located at a first lateral position with respect to the first data read element and a second servo read element located at a second lateral position with respect to the first data read element, wherein the first data read element lies laterally between the first and second servo read elements, and the first and second servo read elements are magnetic read elements, the controller comprising:
    position determination logic for determining a first parameter corresponding to the similarity between data read by the first data read element and the first servo read element, a second parameter corresponding to the similarity between data read by the first data read element and the second servo read element, and a position of the first data read element with respect to the first track based upon a relationship between the first and second parameters; and
    position control logic for adjusting the first data read element to a proper lateral position based upon the determined position of the first data road element 13. The controller of claim 12, wherein the first and second parameters are first and second correlation values, respectively.

14. The controller of claim 13, wherein an equality of the first and second correlation values indicates that the first data read element is centered an the first magnetic track.

15. The controller of claim 12, wherein, at least when the first data read element is properly positioned, each of the first and second servo read elements reads data from the first track and, respectively, from a first adjacent track laterally adjacent the first track and from a second adjacent track laterally adjacent the first track.

16. The controller of claim 12, wherein, at least when the first data read element is properly positioned, the first and second servo read elements and the first data read element read data only from the first track.

17. The controller of claim 12, the head further comprising a write element positioned longitudinally behind the read elements with respect to a travel direction of the tape, wherein the controller is operable to servo using the read elements during writing.

18. The controller of claim 17, the head further comprising a read verification element positioned longitudinally behind the write element with respect to a travel direction of the tape, wherein the controller is operable to verify data written by the write element using the read verification element.

19. The controller of claim 12, further comprising a frequency detector for determining at least one frequency of data read from at least two read elements, wherein the controller includes logic for identifying the track over which the first data read element is positioned based upon the detected at least one frequency.

20. The controller of claim 19, wherein the at least two read elements include the first data read element and the first servo read element.

21. The controller of claim 12, wherein the first and second servo read elements are magneto-resistive read elements.

22. A method for controlling a tape head in a tape drive, wherein the tape head includes a first data read element for reading data from a first track of a magnetic tape, a first servo read element located at a first lateral position with respect to the first data read element, and a second servo read element located at a second lateral position with respect to the first data read element, wherein the first data read element lies laterally between the first and second servo read elements, and the first and second servo read elements are magnetic read elements, the method comprising:
determining a first parameter corresponding to the similarity between data read by the first data read element and the first servo read element;
determining a second parameter corresponding to the similarity between data read by the first data read element and the second servo read element;
determining a position of the first data read element with respect to the first track based upon a relationship between the first and second parameters; and
adjusting the first data read element to a proper lateral position based upon the determined position of the first data read element.

23. The method of claim 22, wherein the first and second parameters are first and second correlation values, respectively.

24. The method of claim 23, wherein an equality of the first and second correlation values indicates that the first data read element is centered on the first magnetic track.

25. The method of claim 22, wherein, at least when the first data read element is properly positioned, each of the first and second servo read elements reads data from the first track and, respectively, from a first adjacent track laterally adjacent the first track and from a second adjacent track laterally adjacent the first track.

26. The method of claim 22, wherein, at least when the first data read element is properly positioned, the first and second servo read elements and the first data read element read data only from the first track.

27. The method of claim 22, the head further comprising a write element positioned longitudinally behind the read elements with respect to a travel direction of the tape, the method comprising servoing using the read elements during writing.

28. The method of claim 22, further comprising:
determining at least one frequency of data read from at least two read elements; and
identifying the track over which the first data read element is positioned based upon the detected at least one frequency.

29. The method of claim 28, wherein the at least two read elements include the first data read element and the first servo read element.

30. The method of claim 22, wherein the first and second servo read elements are magneto-resistive read elements.

31. A tape head comprising:
a first data read element for reading data from a first track of a magnetic tape;
a second data read element for reading data from a second track of the tape;
a first servo read element located at a first lateral position between the first data read element and the second data read element; and
a second servo read element located at a second lateral position with respect to the second data read element, wherein the second data read element is between the first and second servo read elements,
wherein a first parameter corresponds to the similarity between data read by the second data read element and data read by the first servo read element, a second parameter corresponds to the similarity between data read by the second data read element and data read by the second servo read element and a position of the first data read element with respect to the first track is based upon a relationship between the first and second parameters.

32. The head of claim 31, wherein a controller employs the position of the first data read element to adjust the first data read element to a proper lateral position.

33. The head of claim 31, wherein the first and second parameters are first and second correlation values, respectively.

34. The head of claim 33, wherein an equality of the first and second correlation values indicates that the first data read element is centered on the first track.

35. The head of claim 31, wherein, at least when the data read element is properly positioned, each of the first and second servo read elements reads data from the second track and, respectively, from a first adjacent truck laterally adjacent the second track and from a second adjacent track laterally adjacent the second track.

36. The head of claim 31, further comprising a write element positioned longitudinally as to the first data read element with respect to a travel direction of the tape.

37. The head of claim 31, wherein the first and second servo read elements are operable to servo off data from the second track, and the write element is operable to write data to the first track.

38. The head of claim 37, further comprising a third servo read element located at a lateral position with respect to the first data read element so that the first data read element lies between the first and third servo read elements, wherein the first and third servo read elements are operable to servo off the first track written by the write element.

39. The head of claim 31 wherein the first and second servo read elements are operable to read pre-written servo information from the second track.

40. The head of claim 39, wherein the second data read element is operable to read prewritten servo information written to the second track based on servoing off an edge of the tape.

41. A controller in a tape drive for controlling a tape head, the tape head including a first data read element for reading data from a first track of a magnetic tape, a second data read element for reading data from a second track of the tape, a first servo read element located at a first lateral position between the first data read element and the second data read element, and a second servo read element located at a second lateral position with respect to the second data read element, wherein the second data read element is between the first and second servo read elements, the controller comprising:
  position determination logic for determining a first parameter corresponding to the similarity between data read by the second data read element and data read by the first servo read element, a second parameter corresponding to the similarity between data read by the second data read element and data read by the second servo read element, and a position of the first data read element with respect to the first track based upon a relationship between the first and second parameters; and
  position control logic for adjusting the first data read element to a proper lateral position based upon the position of the first data read element 42. The controller of claim 41, wherein the first and second parameters are first and second correlation values, respectively.

43. The controller of claim 42, wherein an equality of the first and second correlation values indicates that the first data read element is centered on the first track.

44. The controller of claim 41, wherein, at least when the first data read element is properly positioned, each of the first and second servo read elements reads data from the second track and, respectively, from a first adjacent track laterally adjacent the second track and from a second adjacent track laterally adjacent the second track.

45. The controller of claim 41, the head further comprising a write element positioned longitudinally as to the first data read element with respect to a travel direction of the tape, wherein the controller is operable to servo off the second track using the first and second servo read elements during writing of the first track.

46. The controller of claim 45, the head further comprising a third servo read element located at a lateral position with respect to the first data read element so that the first data read element lies between the first and third servo read elements, wherein the controller is operable to use the first and third servo read elements to servo off the first track written by the write element.

47. The head of claim 41, wherein the controller is operable to use the first and second servo read elements to read pre-written servo information from the second track.

48. The controller of claim 47, wherein the controller is operable to write the pre-written servo information to the second track by servoing off an edge of the tape.

49. A method for controlling a tape head in a tape drive, the tape head including a first data read element for reading data from a first track of a magnetic tape, a second data read element for reading data from a second track of the tape, a first servo read element located at a first lateral position between the first data read element and the second data read element, and a second servo read element located at a second lateral position with respect to the second data read element, wherein the second data read element is between the first and second servo read elements, the method comprising:
  determining a first parameter corresponding to the similarity between data read by the second data read element and data read by the first servo read element;
  determining a second parameter corresponding to the similarity between data read by the second data read element and data read by the second servo read element;
  determining a position of the first data read element with respect to the first track based upon a relationship between the first and second parameters; and
  adjusting the first data read element to a proper lateral position based upon the position of the first data read element.

50. The method of claim 49, wherein the first and second parameters are first and second correlation values, respectively.

51. The method of claim 50, wherein an equality of the first and second correlation values indicates that the first data read element is centered on the first track.

52. The method of claim 49, wherein, at least when the first data read element is properly positioned, each of the first and second servo read elements reads data from the second track and, respectively, from a first adjacent track laterally adjacent the second track and from a second adjacent track laterally adjacent the second track.

53. The method of claim 49, the heed further comprising a write element positioned longitudinally as to the first data read element with respect to a travel direction of the tape, the method comprising servoing oft the second track using the first and second servo read elements during writing of the first track.

54. The method of claim 53, the head further comprising a third servo read element located at a lateral position with respect to the first data read element so that the first data read element lies between the first and third servo read elements, the method comprising:
  using the first and third servo read elements to servo off the first track written by the write element.

55. The method of claim 49, comprising using the first and second servo read elements to read pre-written servo information from the second track.

56. The method of claim 55, comprising writing the pre-written servo information to the second track by servoing off an edge of the tape.

57. A tape head cluster comprising:
  a data head including at least one data read element for reading data from data tracks in a data band; and
  a servo head mechanically coupled to the data head, and including at least three read elements for servoing off servo tracks in a servo band, wherein a first parameter corresponds to the similarity between data read by a first pair of read elements, a second parameter corresponds to the similarity between data read by a second pair of read elements having one read element in common with the first pair and which is aligned with a first servo track, and a first position of the data head is based upon a relationship between the first and second parameters,
  wherein a controller is operable to laterally position the data head with respect to a first data track based on the first position, each servo read element is substantially the same width as a data track, and each read element of the data head is a fraction of the width of a corresponding read element in the servo head.

58. The tape head cluster of claim 57, wherein each data track is the same fraction of the width of a corresponding servo track in the servo band.

59. The tape head cluster of claim 57, wherein the fraction is one-half.

60. The tape head cluster of claim 57, wherein the servo head includes at least four read elements, and a third parameter corresponds to the similarity between data read by a third pair of read elements having one read element that is in common with the second pair and which is aligned with the first servo track in response to lateral movement of the servo head, a second position of the data head is based upon a relationship between the second and third parameters, and the controller is operable to laterally position the data head with respect to a second data track based on the second position.

61. A controller in a tape drive for controlling a tape head cluster, the tape head cluster including a data head having at least one data read element for reading data from data tracks in a data band, a servo head mechanically coupled to the data head, the servo head including at least three servo read elements for servoing off servo tracks in a servo band, wherein each servo read element is substantially the same width as a data track, and each data read element is a fraction of the width of a servo read element, the controller comprising:
  position determination logic for determining (a) a first parameter corresponding to the similarity between data read by a first pair of servo read elements, (b) a second parameter corresponding to the similarity between data read by a second pair of servo read elements having one read element in common with the first pair and which is aligned with a first servo track, and (c) a first position of the data head based upon a relationship between the first and second parameters; and
  position control logic for laterally positioning the data head with respect to a first data track based upon the first position.

62. The controller of claim 61, wherein each data track is the same fraction of the width of a corresponding servo track in the servo band.

63. The controller of claim 61, wherein the fraction is one-half.

64. The controller of claim 61, the servo head including at least four read elements, wherein:
  in response to the position control logic laterally moving the tape head cluster, the position determination logic is operable to determine (a) a third parameter corresponding to the similarity between data read by a third pair of read elements having one reed element that is in common with the second pair and which is aligned with the first servo track, and (b) a second position of the data head based upon a relationship between the second and third parameters; and
  the position control logic is operable to laterally position the data head to a proper position with respect to a second data track based on the second position.

65. A method for controlling a tape head cluster in a tape drive, the tape head cluster including a data head having at least one data read element for reading data from data tracks in a data band, a servo head mechanically coupled to the data head, the servo head including at least three servo read elements for servoing off servo tracks in a servo band, wherein each servo read element is substantially the same width as a data track, and each data read element is a fraction of the width of a servo read element, the method comprising:
  determining a first parameter corresponding to the similarity between data read by a first pair of servo read elements;
  determining a second parameter corresponding to the similarity between data read by a second pair of servo read elements having one read element in common with the first pair and which is aligned with a first servo track;
  determining a first position of the data head based upon a relationship between the first and second parameters; and
  laterally positioning the data head with respect to a first data track based upon the first position.

66. The method of claim 65, wherein each data track is the same fraction of the width of a corresponding servo track in the servo band.

67. The method of claim 65, wherein the fraction is one-half.

68. The method of claim 65, the servo head including at least four read elements, the method comprising:
  in response to laterally moving the tape head cluster, determining (a) a third parameter corresponding to the similarity between data read by a third pair of read elements having one read element that is in common with the second pair and which is aligned with the first servo track, and (b) a second position of the data head based upon a relationship between the second and third parameters; and
  laterally positioning the data head to a proper position with respect to a second data track based on the second position.

69. A tape head cluster comprising:
  N+1 read elements, including at least three read elements for servoing off a servo track, wherein a first parameter corresponds to the similarity between data read by a first pair of read elements, a second parameter corresponds to the similarity between data read by a second pair of read elements having one read element in common with the first pair and which is aligned with respect to the servo track, wherein the tape head cluster is operable to move laterally to servo N−1 data track positions off the servo track.

70. A controller in a tape drive for controlling a tape head cluster, the tape head cluster including N+1 read elements, the N+1 read elements including at least three servo read elements for servoing off a servo track, the controller comprising:
  position determination logic for determining (a) a first parameter corresponding to the similarity between data read by a first pair of read elements, end (b) a second parameter corresponding to the similarity between data read by a second pair of read elements having one read element in common with the first pair and which is aligned with respect to the servo track; and
  position control logic for laterally moving the tape head cluster to servo N−1 data track positions off the servo track.

71. A method for controlling a tape head cluster in a tape drive, the tape head cluster including N+1 read elements, the N+1 read elements including at least three servo read elements for servoing off a servo track, the method comprising:
  determining a first parameter corresponding to the similarity between data read by a first pair of read elements;
  determining a second parameter corresponding to the similarity between data read by a second pair of read elements having one read element in common with the first pair and which is aligned with respect to the servo track; and
  laterally moving the tape head cluster to servo N−1 data track positions off the servo track.

72. A tape head cluster comprising:

at least one data head for accessing data in a data band; and first and second servo heads, wherein the at least one data head is laterally positioned between the first and second servo heads, each servo head including at least three read elements for servoing off servo tracks in respective first and second servo bands, wherein, for each servo head, a first parameter corresponds to the similarity between data read by a first pair of read elements in the servo head, a second parameter corresponds to the similarity between data read by a second pair of read elements in the servo head, the second pair having one read element in common with the first pair, and wherein first and second positions of the respective first and second servo heads are based upon a relationship between the first and second parameters, and a controller is operable to employ the first and second positions to adjust the head cluster to a lateral position.

73. The tape head cluster of claim 72, wherein the controller is operable to adjust the head cluster to a lateral position that minimizes the errors experienced by the first and second servo heads.

74. A controller in a tape drive for controlling a tape head cluster, the tape head cluster including first and second servo heads and at least one data head for accessing data in a data band, wherein the at least one data head is laterally positioned between the first and second servo heads, and each servo head includes at least three read elements for servoing off servo tracks in respective first and second servo bands, the controller comprising:

position determination logic for determining, for each servo head, (a) a first parameter corresponding to the similarity between data read by a first pair of read elements in the servo head, (b) a second parameter corresponding to the similarity between data read by a second pair of read elements in the servo head, the second pair having one read element in common with the first pair, and (c) first and second positions of the respective first and second servo heads based upon a relationship between the first and second parameters; and position control logic for adjust the head cluster to a lateral position based upon the first and second positions.

75. The controller of claim 74, wherein the position control logic is operable to adjust the head cluster to a lateral position that minimizes the errors experienced by the first and second servo heads.

76. A method for controlling a tape head cluster in a tape drive, the tape head cluster including first and second servo heads and at least one data head for accessing data in a data band, wherein the at least one data head is laterally positioned between the first and second servo heads, and each servo head includes at least three read elements for servoing off servo tracks in respective first and second servo bands, the method comprising:

determining, for each servo head, (a) a first parameter corresponding to the similarity between data read by a first pair of read elements in the servo head, (b) a second parameter corresponding to the similarity between data read by a second pair of read elements in the servo head, the second pair having one read element in common with the first pair, and (c) first and second positions of the respective first and second servo heads based upon a relationship between the first and second parameters; and adjusting the head cluster to a lateral position based upon the first and second positions.

77. The method of claim 76, comprising adjusting the head cluster to a lateral position that minimizes the errors experienced by the first and second servo heads.

* * * * *